US012538095B2

(12) United States Patent
Vanghi et al.

(10) Patent No.: US 12,538,095 B2
(45) Date of Patent: Jan. 27, 2026

(54) METHODS OF CONTROLLING LOCATION DEVICES IN A FLIGHT MODE

(71) Applicant: QUALCOMM Incorporated, San Diego, CA (US)

(72) Inventors: Vieri Vanghi, Florence (IT); Jeffery Mark Torrance, Stanford, CA (US)

(73) Assignee: QUALCOMM Incorporated, San Diego, CA (US)

( * ) Notice: Subject to any disclaimer, the term of this patent is extended or adjusted under 35 U.S.C. 154(b) by 450 days.

(21) Appl. No.: 17/809,870

(22) Filed: Jun. 29, 2022

(65) Prior Publication Data
US 2024/0007824 A1 Jan. 4, 2024

(51) Int. Cl.
*H04W 4/029* (2018.01)
*G01S 5/14* (2006.01)
*G01S 19/47* (2010.01)
*H04W 4/40* (2018.01)
*H04W 84/06* (2009.01)

(52) U.S. Cl.
CPC ............. *H04W 4/029* (2018.02); *G01S 5/14* (2013.01); *G01S 19/47* (2013.01); *H04W 4/40* (2018.02); *H04W 84/06* (2013.01)

(58) Field of Classification Search
CPC ....... H04W 4/029; H04W 4/40; H04W 84/06; H04W 48/16; H04W 4/027; G01S 5/14; G01S 19/47; H04M 1/72457; H04M 1/72463; H04M 1/7246
See application file for complete search history.

(56) References Cited

U.S. PATENT DOCUMENTS

| 9,277,355 | B1* | 3/2016 | Rosenbach | H04W 4/027 |
| 10,656,262 | B2* | 5/2020 | Stauskas | G01C 21/1652 |
| 11,639,981 | B2* | 5/2023 | Wu | H04W 4/021 342/28 |
| 2009/0117919 | A1* | 5/2009 | Hershenson | H04W 48/04 455/456.4 |
| 2009/0204370 | A1* | 8/2009 | Chu | H04L 67/12 702/188 |
| 2010/0267375 | A1* | 10/2010 | Lemmon | G06F 21/74 455/418 |
| 2018/0246200 | A1* | 8/2018 | Goossen | G01S 7/003 |

(Continued)

FOREIGN PATENT DOCUMENTS

WO 2013163334 A2 10/2013

OTHER PUBLICATIONS

International Search Report and Written Opinion—PCT/US2023/025481—ISA/EPO—Sep. 21, 2023.

*Primary Examiner* — Kabir A Timory
(74) *Attorney, Agent, or Firm* — Procopio, Cory, Hargreaves & Savitch LLP

(57) ABSTRACT

Aspects presented herein may enable a tracking device to disable its transmitter based on determining whether the wireless device is within the vicinity or a threshold distance of an airport and/or based on information or measurements obtained from its modem receiver. In one aspect, a wireless device detects whether the wireless device is within a threshold distance of a target location or whether the wireless device is airborne. The wireless device disables a transmitter of the wireless device based on detecting that the wireless device is within the threshold distance of the target location or that the wireless device is airborne.

24 Claims, 12 Drawing Sheets

(56) References Cited

U.S. PATENT DOCUMENTS

| | | | |
|---|---|---|---|
| 2019/0270459 A1* | 9/2019 | Williams | H04M 1/72454 |
| 2020/0187151 A1* | 6/2020 | Wang | H04W 36/0058 |
| 2021/0243695 A1* | 8/2021 | Korrapati | H04W 52/0274 |
| 2022/0007294 A1 | 1/2022 | Korrapati et al. | |

* cited by examiner

METHODS OF CONTROLLING LOCATION DEVICES IN A FLIGHT MODE

TECHNICAL FIELD

The present disclosure relates generally to communication systems, and more particularly, to communication systems involving tracking.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus detects whether the wireless device is within a threshold distance of a target location or whether the wireless device is airborne. The apparatus disables a transmitter of the wireless device based on detecting that the wireless device is within the threshold distance of the target location or that the wireless device is airborne.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
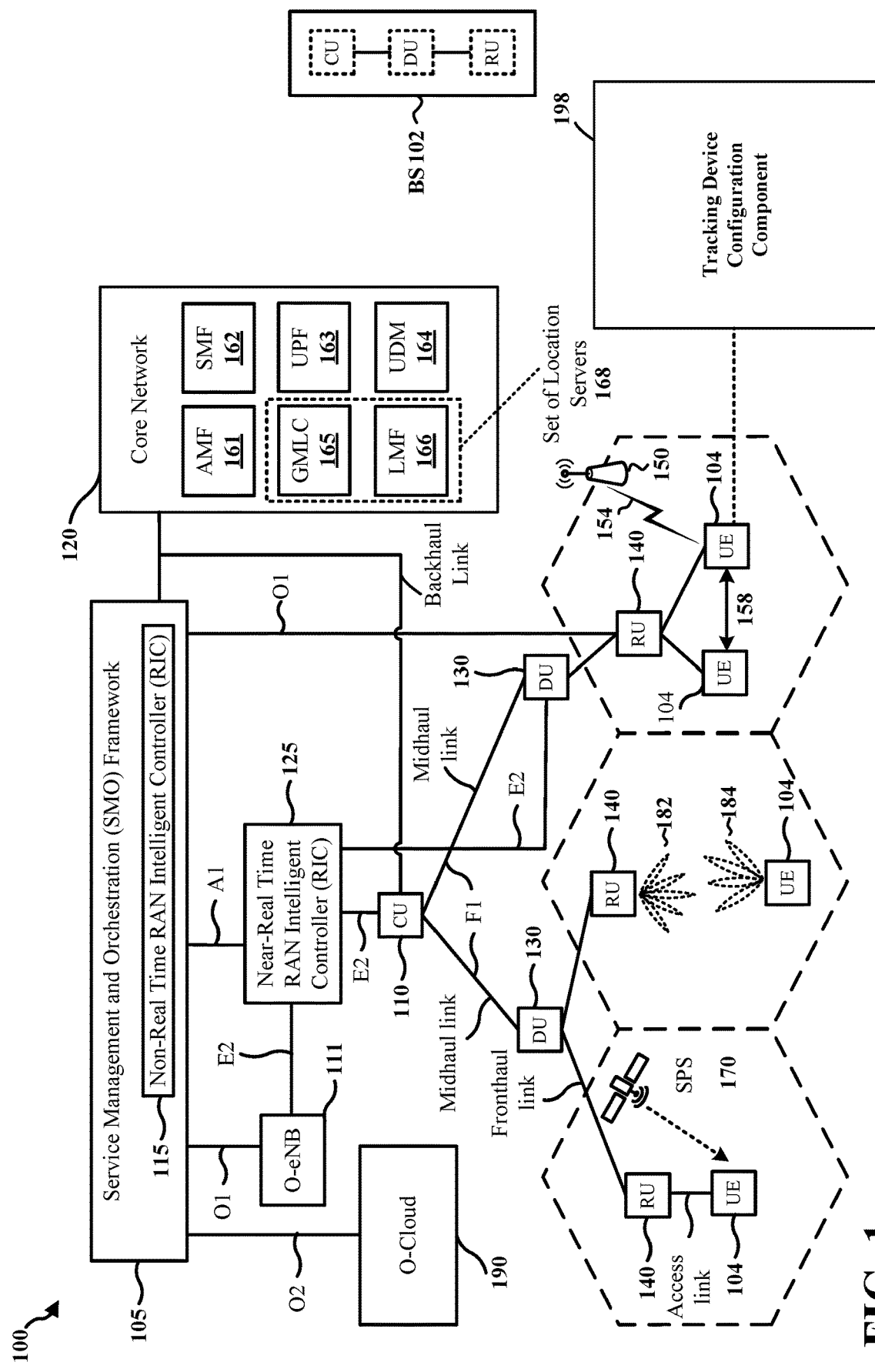
FIG. 1 is a diagram illustrating an example of a wireless communications system and an access network.

Aspects presented herein provide improved ways for tracking devices to disable some of their functions, such as transmission functions, reception functions, and/or positioning functions, etc., to meet air regulations. Aspects presented herein may enable tracking devices to determine whether they are airborne or to be loaded onto an airplane without utilizing additional sensors. For example, in one aspect of the present disclosure, a tracking device may be configured to use terrestrial positioning information to determine whether it is in the vicinity of an airport, and the tracking device may disable its transmitter (or transmission/communication function) when the tracking device detects that it is within a pre-defined range of the airport. In another aspect of the present disclosure, a tracking device may use information obtained by its modem receiver, such as Doppler estimate or equivalent metric, to determine whether it may be located onto an airborne airplane, and the tracking device may disable its transmitter when the tracking device detects that it may be located onto an airborne airplane (or is airborne). Aspects presented herein may also be used in conjunction or in augmentation with other airborne detection methods, such as acceleration sensing and pressure change sensing to disable the radio transmitter, to comply with the airline regulations.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit.

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RA configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to detect whether the wireless device is within a threshold distance of a target location or whether the wireless device is airborne; and disable a transmitter of the wireless device based on detecting that the wireless device is within the threshold distance of the target location or that the wireless device is airborne via the tracking device configuration component 198.

Figure 2:
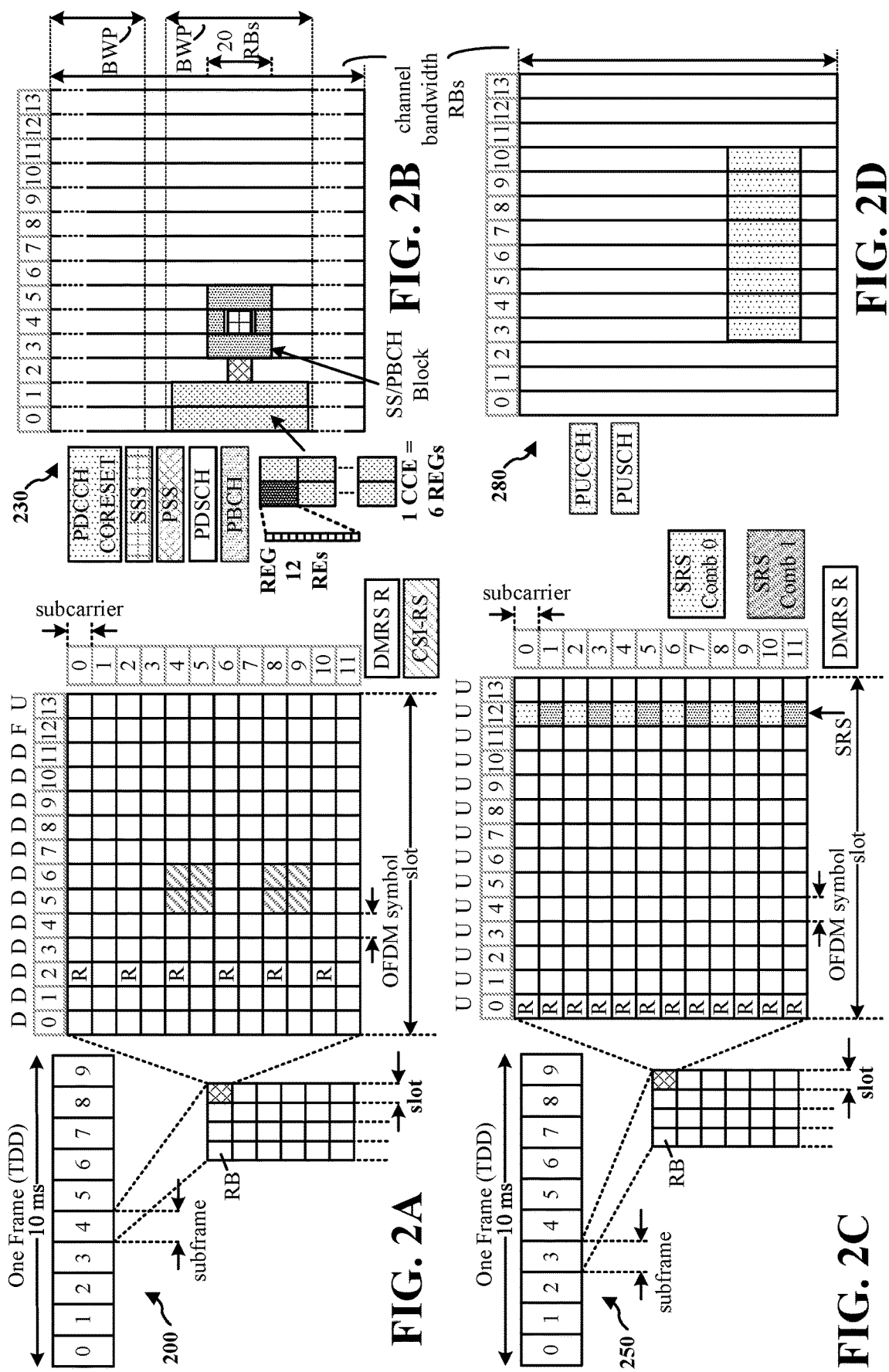
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame.

The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
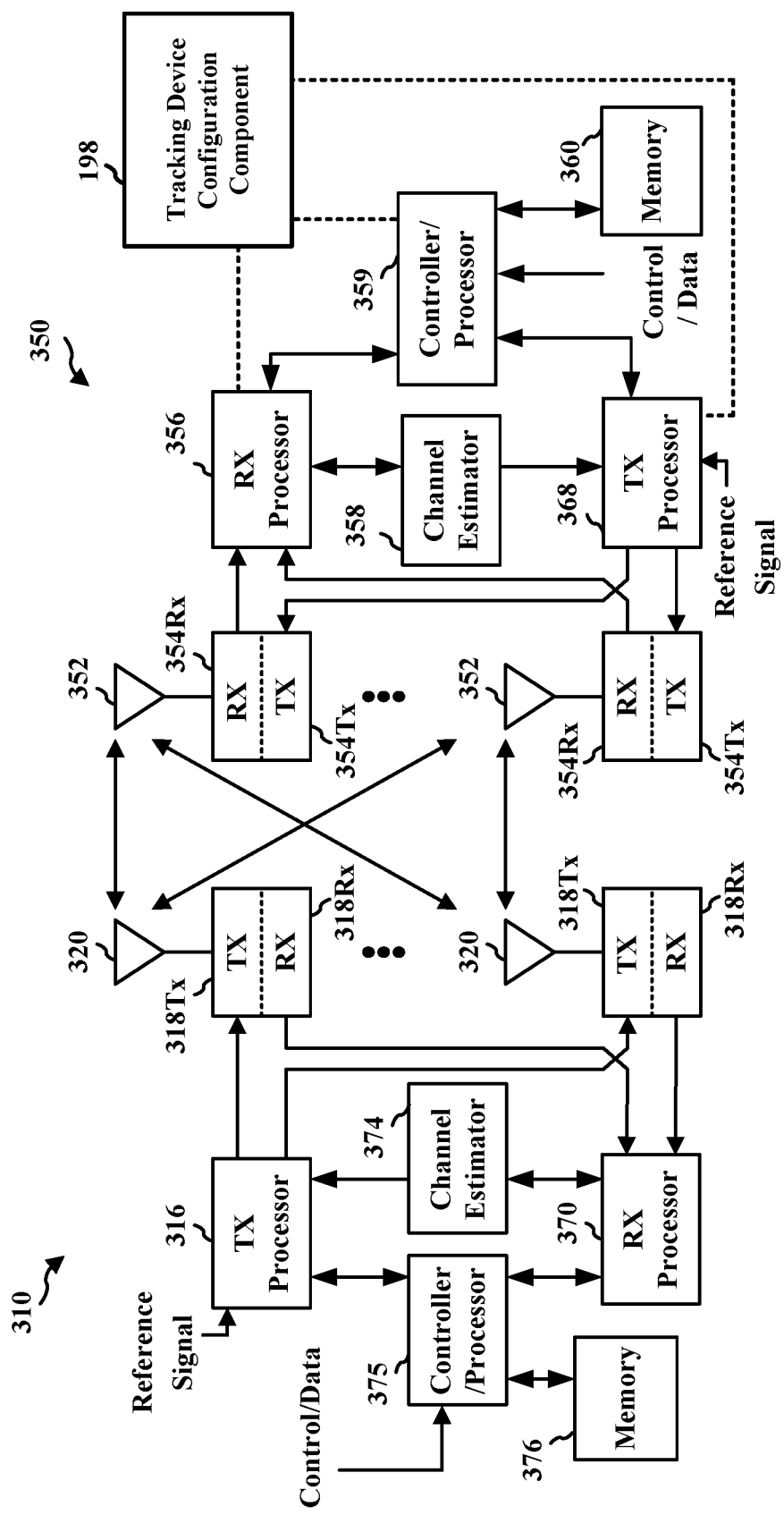
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the tracking device configuration component 198 of FIG. 1.

Figure 4:
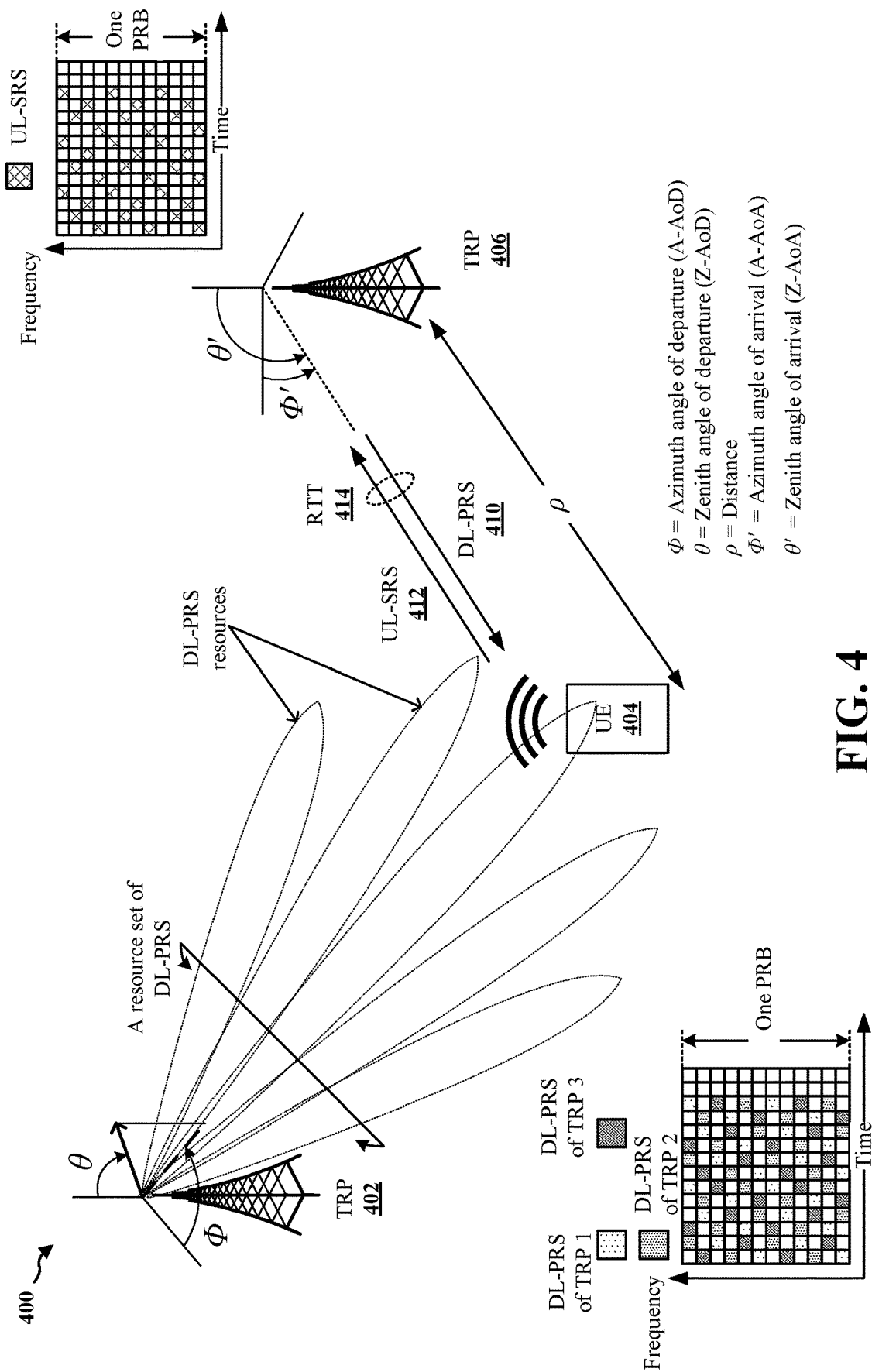
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX}-T_{PRS\_TX}\|-\|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL- SRS-RSRP at multiple TRPs 402, 406 of uplink signals transmitted from UE 404. The UE 404 measures the UE Rx-Tx time difference measurements (and/or DL-PRS-RSRP of the received signals) using assistance data received from the positioning server, and the TRPs 402, 406 measure the gNB Rx-Tx time difference measurements (and/or UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL-PRS-RSRP) of downlink signals received from multiple TRPs 402, 406 at the UE 404. The UE 404 measures the DL RSTD (and/or DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL-SRS-RSRP) at multiple TRPs 402, 406 of uplink signals transmitted from UE 404. The TRPs 402, 406 measure the UL-RTOA (and/or UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

In addition to network-based UE positioning technologies, a wireless device (e.g., a base station, a component of the base station, a UE, etc.) may also be configured to include radar capabilities, which may be referred to as "radio frequency (RF) sensing" and/or "cellular-based RF sensing." For example, a wireless device may transmit radar reference signals (RRSs) and measure the RRSs reflected from one or more objects. Based at least in part on the measurement, the wireless device may determine or estimate a distance between the wireless device and the one or more objects. In another example, a first wireless device may also receive RRSs transmitted from a second wireless device, where the first wireless device may determine or estimate a distance between the first wireless device and the second wireless device based at least in part on the received RRS. As such, in some examples, RF sensing techniques may be used for UE positioning and/or for assisting UE positioning. For purposes of the present disclosure, a device that is capable of performing RF sensing (e.g., transmitting and/or receiving RRS for detecting an object or for estimating the distance between the device and the object) may be referred to as an "RF sensing node." For example, an RF sensing node may be a UE, a base station, a component of the base station, a TRP, a device capable of transmitting RRS, and/or a device configured to perform radar functions, etc.

Figure 5:
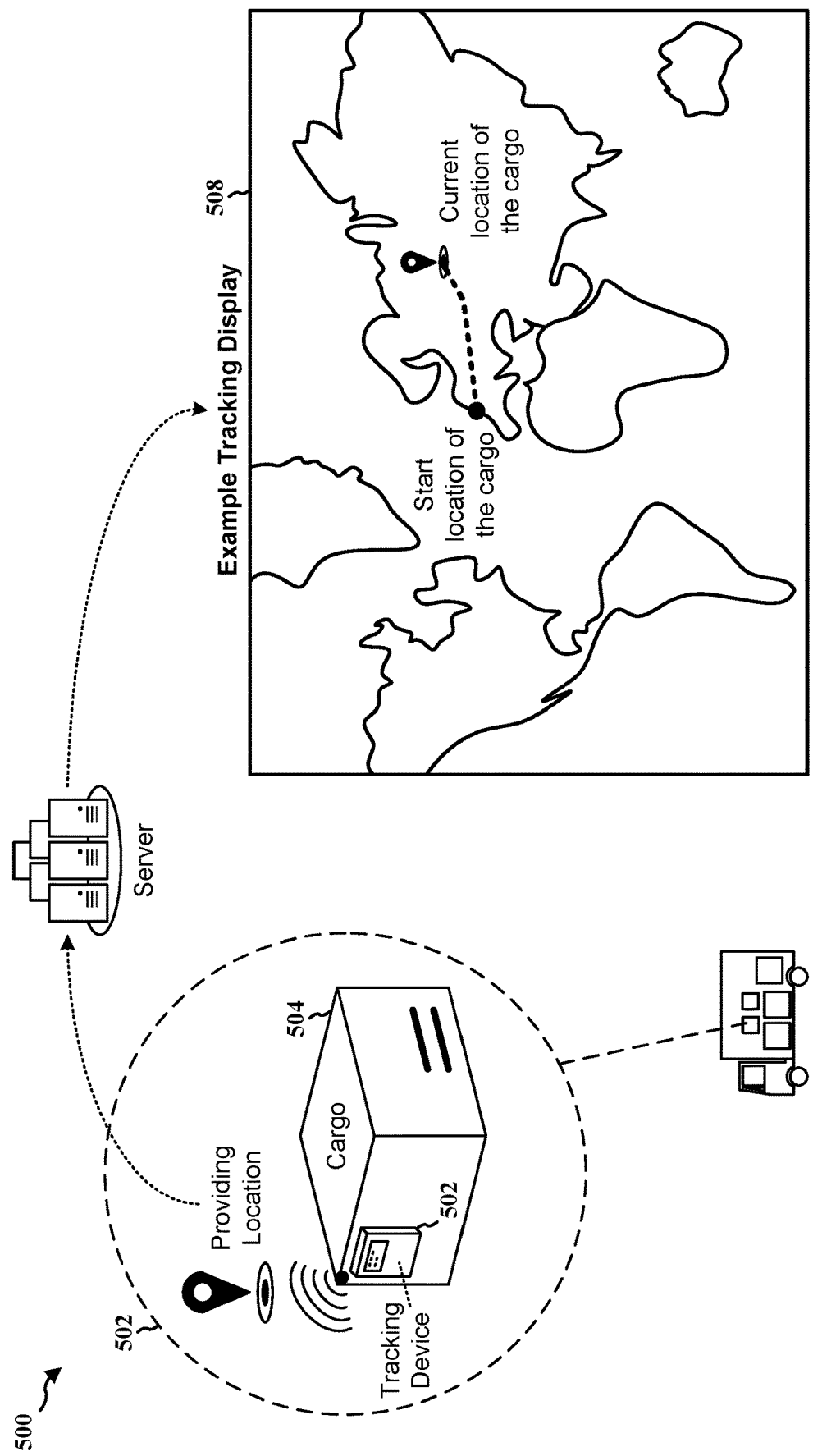
FIG. 5 is a diagram illustrating an example tracking device in accordance with various aspects of the present disclosure.

FIG. 5 is a diagram 500 illustrating an example tracking device in accordance with various aspects of the present disclosure. A tracking device (or a tracker/tracker device) may refer to a portable apparatus/unit that enables a user to monitor and track the location of certain things, such as a cargo, a transportation, or a person, etc. In one example, as shown at 506, a tracking device 502 may be used by a shipping company for tracking a cargo 504, where the tracking device 502 may be co-located with the cargo 504 and is configured to provide its location periodically or at certain time periods. For example, the tracking device 502 may be connected to a series of satellites to determine its location based on trilateration, where the tracking device may use the position of three or more satellites from the GNSS/GPS network and its distance from the satellites to determine latitude, longitude, elevation, and/or time of the tracking device 502. Then, the tracking device 502 may report its location information periodically to a tracking/ location server. As shown at 508, based on the location information collected by the tracking/location server, the shipping company or a user may be able to determine or discover the whereabouts and/or the travel history of the cargo 504 via a tracking display or a tracking notification.

While tracking devices may be similar to navigation systems, there may be few differences. For example, navigation systems may show users their location on a digital map and then provide navigation instructions to users for reaching a designated point. On the other hand, tracking devices may track the location (e.g., GNSS/GPS data) and trip history for things to be tracked, and the tracking information/data is then transmitted/broadcasted to a computer, smartphone, or tablet, etc.

Figure 6:
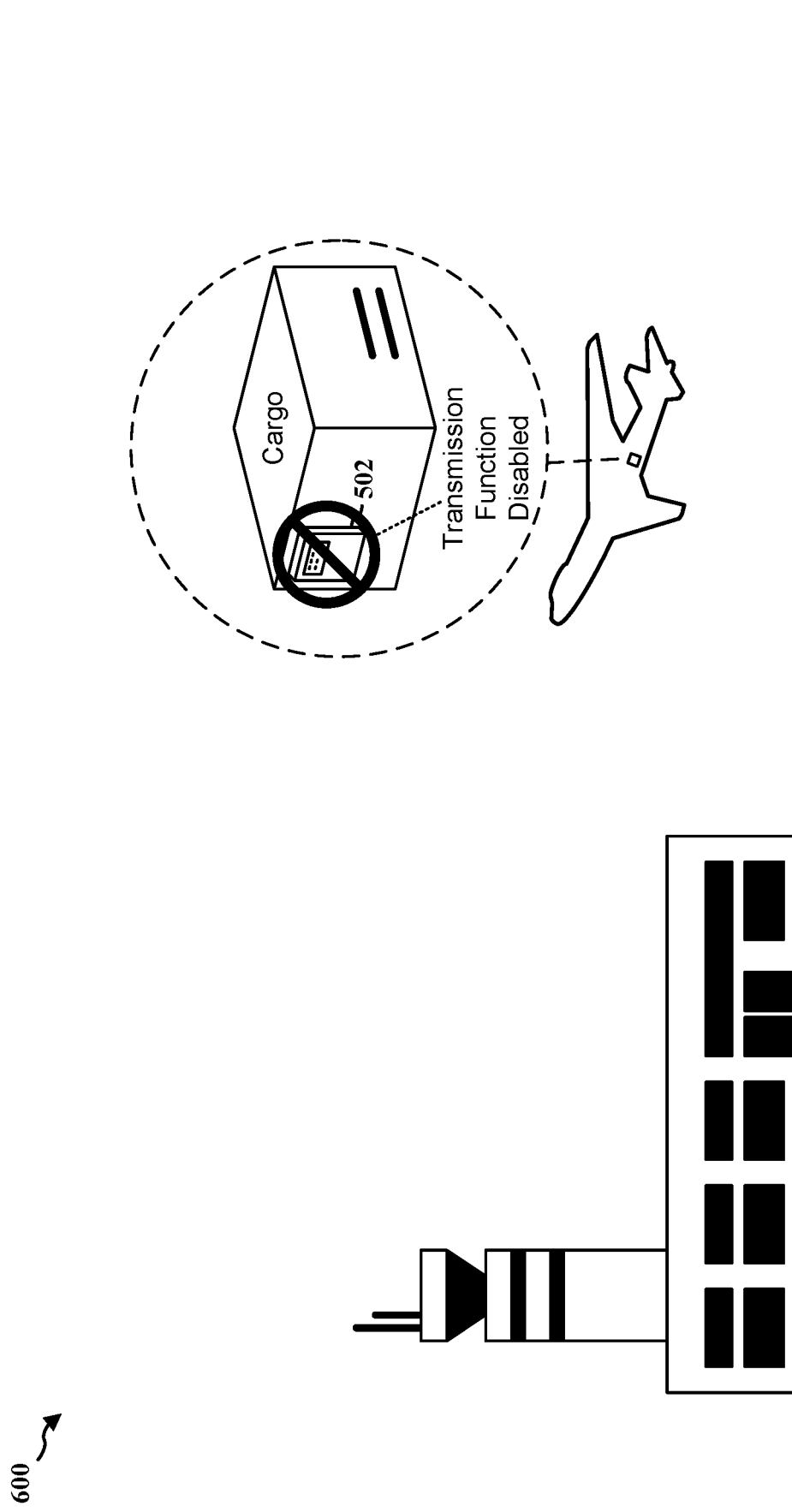
FIG. 6 is a diagram illustrating an example of disabling the transmitter of a tracking device in accordance with various aspects of the present disclosure.

In some scenarios, a tracking device may be specified to disable some of its functions during certain conditions. For example, as shown by a diagram 600 of FIG. 6, the tracking device 502 may be configured to disable or pause its tracking/positioning function and/or location reporting function while the tracking device 502 is in an airplane, such that the tracking device does not interfere with the communication system of the airplane, and also for other safety reasons (e.g., avoiding the exact location of the airplane to be tracked). In another example, a cargo designated for, or passing through, a restrict area may also be specified to disable or pause its tracking/positioning function and/or location reporting function while in the restrict area.

The conditions for which a tracking device is to be disabled/paused may be regulated by governments. For example, European Union (EU)'s Commission Regulation No. 965/2012 regulates that the use of a tracking device to track a commercial shipment on board of an aircraft, such as on a commercial plane or a cargo plane, may be authorized having ensured that the tracking device has no impact on the safe operations of the aircraft according to the criteria provided by European Aviation Safety Agency (EASA)'s Acceptable Means of Compliance (AMC) guidelines. Similar guidelines have also been adopted by other countries, such as by Federal Aviation Administration (FAA) of the United States, and International Air Transport Association (IATA). In some examples, the safe operation criteria may mandate that a tracking device used on a commercial plane or a cargo plane is specified to include a minimum of two independent means to turn off the wireless functions of the tracking device when the tracking device is airborne. In other words, when the tracking device is airborne, there may be at least two mechanisms for the tracking device to disable or pause its transmitter or its communication system (e.g., the transmission of tracking information and/or reception of a communication, etc.). The at least two mechanisms are also specified to be independent of each other, such that if one of the mechanisms fails, the other mechanism(s) may still be able to disable or pause the transmitter/communication system. For purposes of the present disclosure, the term "airborne" may refer to something is leaving the ground (e.g., an airplane that is taking off) and/or something that is in the air (e.g., after an airplane takes off).

In one example, mechanisms that may be used by a tracking device (e.g., the tracking device 502) for detecting whether the tracking device is airborne may include the use of sensors. For example, a tracking device may include an accelerometer (or a speed sensor) that is capable of detecting the acceleration/speed of the tracking device, and the tracking device may be configured to disable its wireless functions (e.g., transmitter/communication system) when the tracking device exceeds an acceleration/speed threshold and/or when certain acceleration/speed pattern is detected. In another example, a tracking device may include a pressure sensor, where the tracking device may be configured to disable its wireless functions when the tracking device is under certain pressure ranges. For example, at ground level, the air pressure in an airplane may be approximately 14 pounds per square inch (PSI). When the airplane takes off and reaches its typical cruising altitude (e.g., usually about 30,000 to 40,000 feet), the air pressure in the airplane may be reduced to just 4 to 5 PSI. As such, the tracking device may be configured to disable its wireless function when the air pressure is below 10 PSI, for example.

In another example, a tracking device may include a sound sensor/microphone, where the tracking device may be configured to disable its wireless functions when certain sounds are detected, such as the sound of an airplane engine (or sonic wave from the aircraft engine). In another example, a tracking device may be configured to detect signals generated from an airplane transponder using a signal sensor, and the tracking device may disable its wireless function when airplane transponder signals are detected. An airplane transponder may provide information to an air traffic control (ATC) about the airplane's location in space and in most cases its altitude as well. The airplane transponder may identify an airplane uniquely and helps ATC to keep airplanes separated to ensure the safety of air travel.

While a tracking device may determine whether it is airborne by using one or more sensors, use of sensor(s) may increase the cost and power consumption of the tracking device. For example, the tracking device may be specified to activate its sensors at all times, which may consume a significant amount of power. In addition, for a tracking device to use sensor(s), additional hardware components and processor may be specified, which may increase the complexity and manufacturing cost of the tracking device.

Aspects presented herein provide improved ways for tracking devices to disable some of their functions, such as transmission functions, reception functions, and/or positioning functions, etc., to meet air regulations. Aspects presented herein may enable tracking devices to determine whether they are airborne or to be loaded onto an airplane without utilizing additional sensors. For example, in one aspect of the present disclosure, a tracking device may be configured to use terrestrial positioning information (e.g., position location system that uses land-based transmitters or reference points to act as reference points for the calculation of position information) to determine whether it is in the vicinity of an airport, and the tracking device may disable its transmitter (or transmission/communication function) when the tracking device detects that it is within a pre-defined range of the airport. In another aspect of the present disclosure, a tracking device may use information obtained by its modem receiver, such as Doppler estimate or equivalent metric, to determine whether it may be located onto an airborne airplane, and the tracking device may disable its transmitter when the tracking device detects that it may be located onto an airborne airplane (or is airborne). Aspects presented herein may also be used in conjunction or in augmentation with other airborne detection methods, such as acceleration sensing and pressure change sensing to disable the radio transmitter, to comply with the airline regulations.

Figure 7:
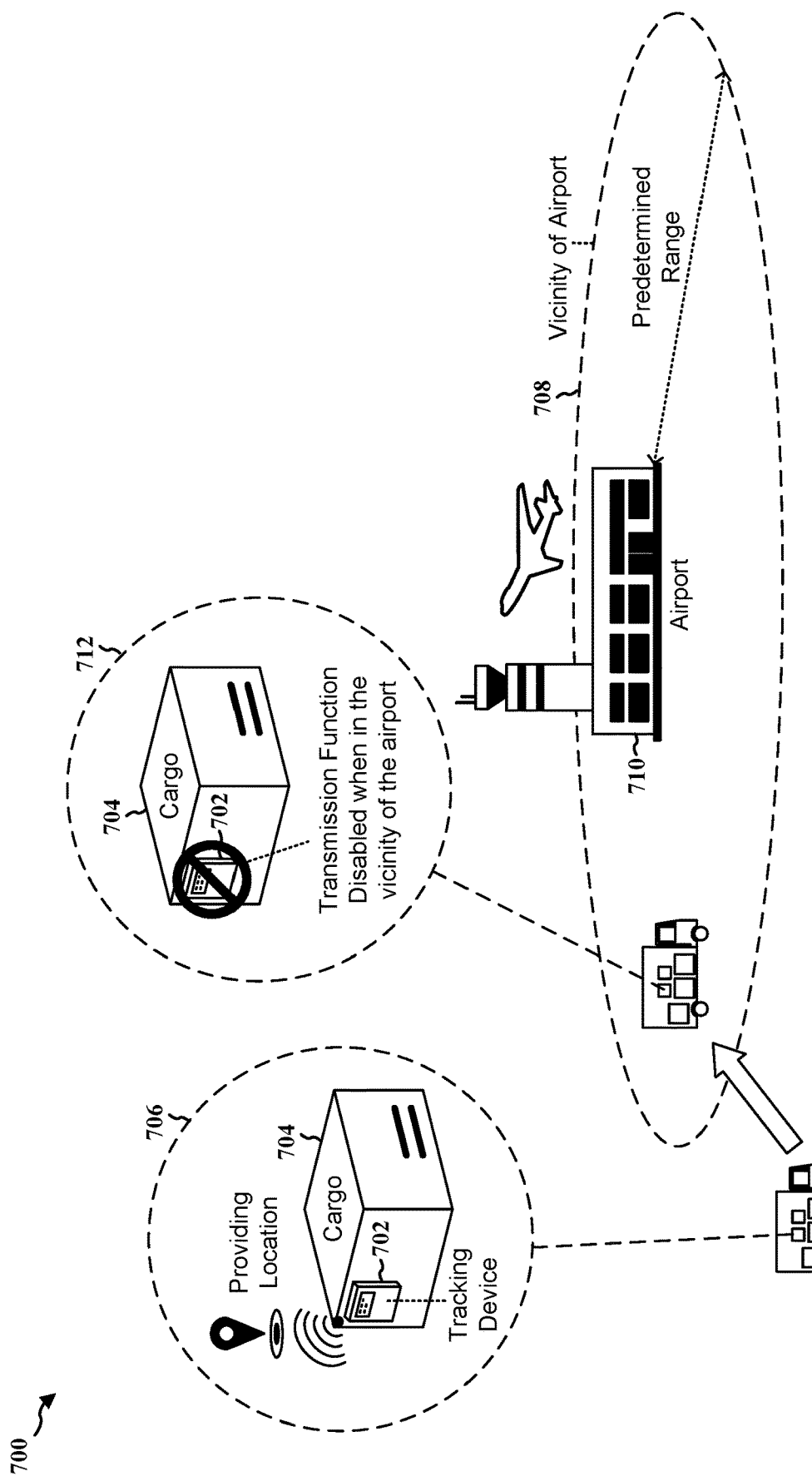
FIG. 7 is a diagram illustrating an example of a tracking device disabling its transmission function when it is within the vicinity of an airport in accordance with various aspects of the present disclosure.

FIG. 7 is a diagram 700 illustrating an example of a tracking device disabling its transmission function when it is within the vicinity of an airport in accordance with various aspects of the present disclosure. As shown at 706, a tracking device 702 (which may also be referred to as a tracker, a tracker device, or a wireless device) may be co-located with or placed on a cargo 704. The tracking device 702 may be configured to determine its position periodically or within certain time periods (e.g., based on terrestrial positioning information obtained via GNSS/GPS based positioning and/or network based positioning described in connection with FIG. 4), and the tracking device 702 may report its position information (e.g., longitude and latitude coordinates, elevation, and/or time) to a location/tracking server, such that the location and travel history of the cargo 704 may be tracked over time as described in connection with FIG. 5.

In one aspect, the tracking device 702 may be configured to determine whether it is in the vicinity of an airport, and the tracking device 702 may disable some of its functions, such as the transmission function (e.g., via disabling its transmitter), when the tracking device 702 determines that it is in the vicinity of the airport. For example, as shown at 708, the vicinity of an airport 710 may be defined based on a predetermined range (e.g., a threshold distance) from the airport 710 (or from a center point of the airport 710). In another example, the vicinity of the airport 710 may be defined by a set of coordinate ranges (e.g., longitude X-Y and latitude M-N).

In one example, information associated with the vicinity of the airport 710 may be programmed and stored at the tracking device 702, such that the tracking device 702 may become aware when it enters the vicinity of the airport 710 or it is within a predetermined range of the airport 710. For example, mapping information associated with the region in which the airport 710 is located may be stored at the tracking device 702 or provided to the tracking device 702 via live update. Thus, when the tracking device 702 detects that it is within the vicinity or a predetermined range of the airport 710, the tracking device 702 may automatically disable at least its transmission function (e.g., its transmitter), such as shown at 712.

In another example, information associated with the vicinity of the airport 710 or whether the tracking device 702 is within the vicinity of the airport 710 may be provided by a location/tracking server (or conveyed by a cloud platform) to reduce the amount of information stored at the tracking device 702. For example, after the tracking device 702 transmits its location information to a location/tracking server, if the location/tracking server determines that the tracking device 702 is in the vicinity or a predetermined range of the airport 710, the location/tracking server may inform the tracking device 702 to disable at least the transmission function of the tracking device, such as shown at 712.

Figure 8:
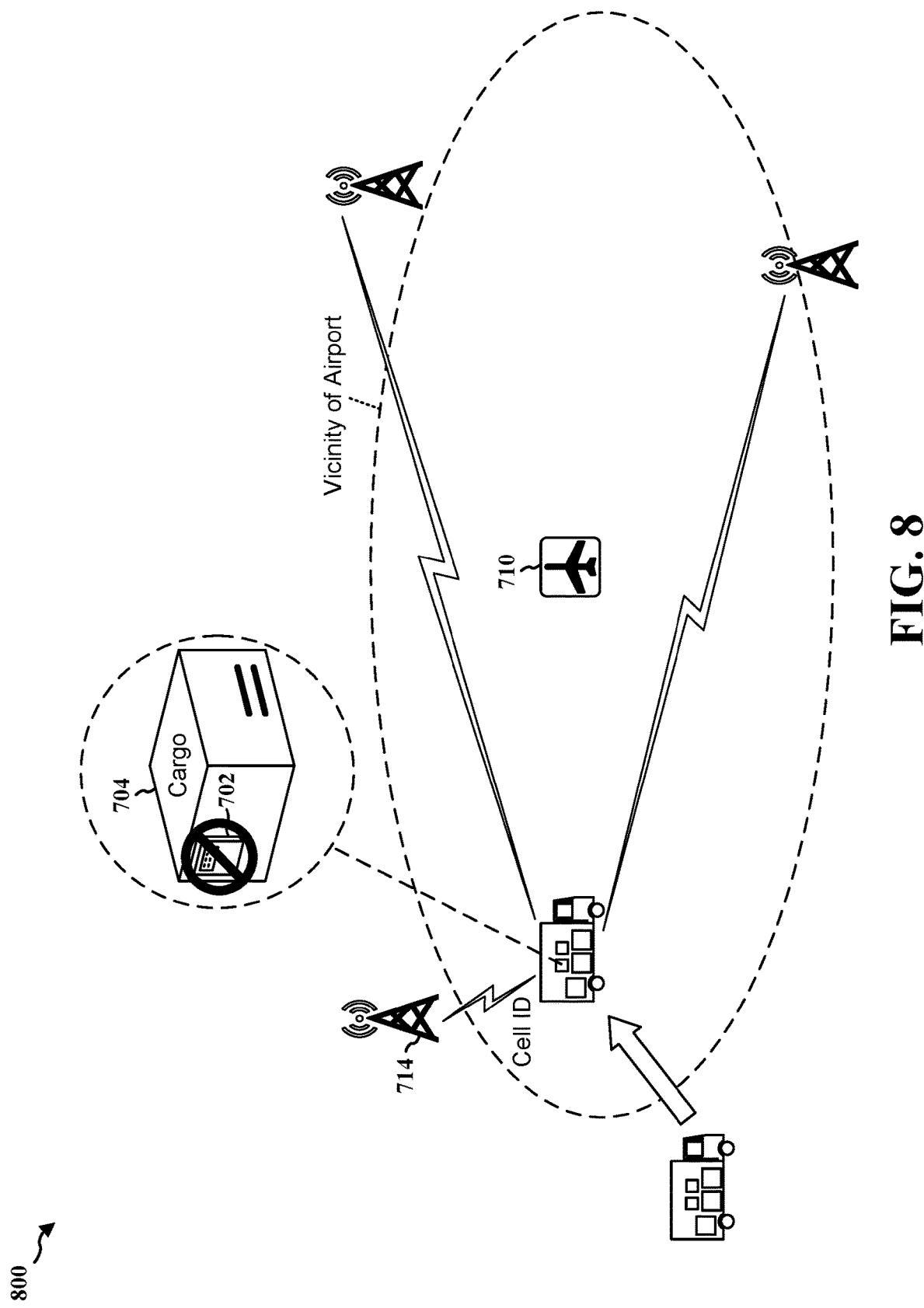
FIG. 8 is a diagram illustrating an example of a tracking device determining it is within the vicinity of an airport in accordance with various aspects of the present disclosure.

In another example, as shown by a diagram 800 of FIG. 8, the tracking device 702 may determine whether it is in the vicinity or a predetermined range of the airport 710 based on information received from a base station or a component of a base station. For example, a base station 714 located in proximity to the airport 710 may be associated with a cell identification (ID), and the base station 714 may broadcast the cell ID periodically. The tracking device 702 may be configured with a list of cell IDs that are associated with base stations/cells within the vicinity of the airport 710. Then, if the tracking device 702 receives a cell ID broadcasted by a base station, such as the base station 714, that matches the list of cell IDs associated with base stations/cells within the vicinity of the airport 710, the tracking device 702 may determine that it is within the vicinity of the airport 710 and disable at least its transmission function.

Aspects discussed in connection with FIGS. 7 and 8 may enable a tracking device to disable at least its transmission function (e.g., transmitter) before the tracking device is airborne, thereby complying with certain air regulations. In addition, the tracking device (e.g., the tracking device 702) may further be configured to monitor whether it is still within the vicinity of a departing airport (e.g., the airport 710) and/or within the vicinity of a destination airport. If the tracking device detects that it is outside of the vicinity of the departing airport and/or the destination airport, the tracking device may enable/resume its transmission function (or determine that it is not airborne).

As air regulations may specify a tracking device to provide at least two independent means of turning off at least the transmission function of the tracking device when the tracking device is airborne, in another aspect of the present disclosure, the tracking device 702 discussed in connection with FIGS. 7 and 8 may further include at least one other means of detecting whether it is airborne. For example, as described in connection with FIG. 6, the tracking device 702 may further include at least one sensor that is capable of detecting the acceleration/speed of the tracking device 702 and disabling the transmission function of the tracking device 702 when the tracking device 702 exceeds an acceleration/speed threshold, capable of detecting the pressure surrounding the tracking device 702 and disabling the transmission function of the tracking device 702 when the tracking device 702 is under certain pressure range or exceeds certain pressure threshold, capable of detecting the sonic wave from the airplane engine and disabling the transmission function of the tracking device 702 when sonic wave from the airplane engine is detected, and/or capable of detecting the transponder signals from the airplane and disabling the transmission function of the tracking device 702 when transponder signals are detected, etc. In another example, the means for disabling transmitter when the tracking device 702 is airborne may include detecting the elevation and/or speed of the tracking device 702 via GPS/GNSS system/receiver, and disabling the transmission function based on the elevation exceeding certain elevation threshold (e.g., height) and/or the speed exceeding a speed threshold. In another example, the means for disabling transmitter when the tracking device 702 is airborne may be based on a flight schedule, where the tracking device 702 may disable its transmitter for a threshold time period that the tracking device 702 (or its associated cargo) is scheduled to fly.

In addition, the tracking device 702 may also be configured to resume its transmission function based on the at least one sensor. For example, the tracking device 702 may be configured to disable its transmission function based on detecting that it is within the vicinity of the airport 710, and the tracking device 702 may enable its transmission function after detecting that the airplane is no longer airborne (e.g., based on pressure, speed, transponder signals, etc.).

As most tracking devices are capable of determining their positions and/or communicating with a location/tracking server (e.g., via a base station or a component of the base station), aspects discussed in connection with FIGS. 7 and 8 may be implemented on these tracking devices without specifying additional sensor(s), sensing equipment(s), and/or hardware components, which may reduce the manufacturing cost of the tracking devices and/or the power consumption of the tracking devices from using the sensor(s).

Figure 9:
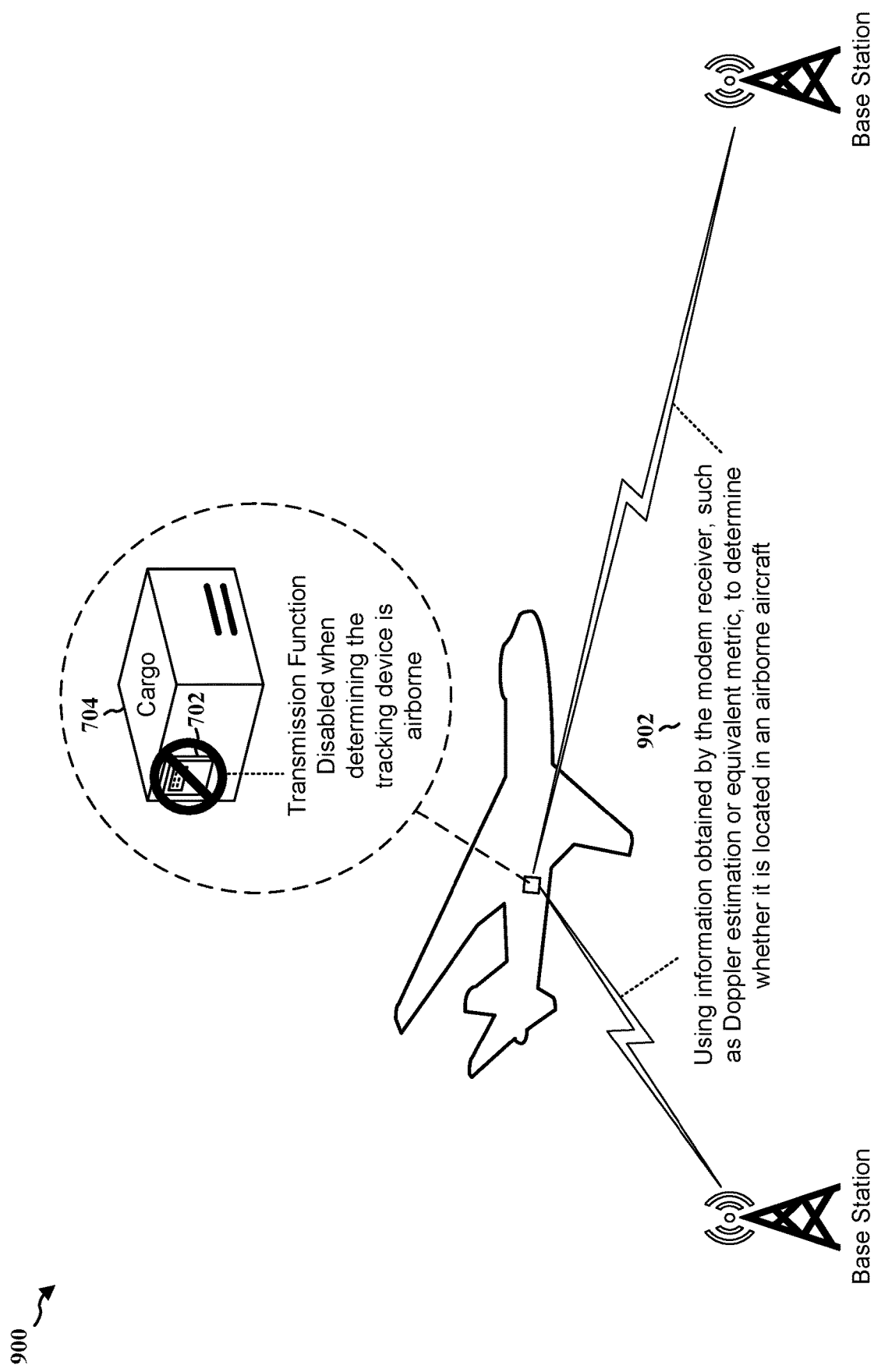
FIG. 9 is a diagram illustrating an example of a tracking device determining whether it is airborne based on information obtained by its modem in accordance with various aspects of the present disclosure.

FIG. 9 is a diagram 900 illustrating an example of a tracking device determining whether it is airborne based on information obtained by its modem in accordance with various aspects of the present disclosure. In another aspects of the present disclosure, the tracking device 702 may determine whether it is airborne or located in an airborne airplane based on information received from its modem receiver (or cellular baseband processor), and the tracking device 702 may disable its transmission function (or transmitter) when it determines that it is airborne or in an airborne plane.

For example, as shown at 902, the tracking device 702 may calculate Doppler estimation for one or more signals received from one or more base stations, and the tracking device 702 may determine whether it is airborne based on the Doppler estimation exceeding a Doppler threshold or fits certain Doppler pattern. In another example, the tracking device 702 may calculate its velocity of the wireless device relative to a ground location based on one or more signals received from one or more base stations, the tracking device may determine whether it is airborne based on the velocity exceeding a velocity threshold.

Aspects discussed in connection with FIG. 7 may enable a tracking device to disable at least its transmission function before or when the tracking device is airborne, thereby complying with certain air regulations. In addition, the tracking device (e.g., the tracking device 702) may further be configured to monitor whether it is no longer airborne via similar means (e.g., based on Doppler estimation meeting another Doppler threshold or velocity below the velocity threshold, etc.). If the tracking device detects that it is no longer airborne, the tracking device may enable/resume its transmission function.

Similarly, as air regulations may specify a tracking device to provide at least two independent means of turning off at least the transmission function of the tracking device when the tracking device is airborne, in another aspect of the present disclosure, the tracking device 702 discussed in connection with FIG. 9 may further include at least one other means of detecting whether it is airborne or whether it is in the vicinity of an airport (as described in connection with FIGS. 7 and 8). For example, as described in connection with FIG. 6, the tracking device 702 may further include at least one sensor that is capable of detecting the acceleration/ speed of the tracking device 702 and disabling the transmission function of the tracking device 702 when the tracking device 702 exceeds an acceleration/speed threshold, capable of detecting the pressure surrounding the tracking device 702 and disabling the transmission function of the tracking device 702 when the tracking device 702 is under certain pressure range or exceeds certain pressure threshold, capable of detecting the sonic wave from the airplane engine and disabling the transmission function of the tracking device 702 when sonic wave from the airplane engine is detected, and/or capable of detecting the transponder signals from the airplane and disabling the transmission function of the tracking device 702 when transponder signals are detected, etc. In another example, in addition to disabling transmission function based on information obtained via the modem receiver of the tracking device 702, the tracking device 702 may further be configured to disable at least its transmission function when the tracking device is within the vicinity of an airport, such as described in connection with FIGS. 7 and 8. In other words, the tracking device 702 may include aspects described in connection with FIGS. 7 to 9. In another example, the means for detecting whether the tracking device 702 may include detecting the elevation and/or speed of the tracking device 702 via GPS/GNSS system/receiver, and the tracking device 702 may disable the transmission function based on the elevation exceeding certain elevation threshold (e.g., height) and/or the speed exceeding a speed threshold.

Similarly, the tracking device 702 may also be configured to resume its transmission function based on the at least one sensor. For example, the tracking device 702 may be configured to disable its transmission function based on Doppler estimation/velocity exceeding a threshold, and the tracking device 702 may enable its transmission function after detecting that the airplane is no longer airborne (e.g., based on pressure, speed, transponder signals, etc.).

Aspects discussed in connection with FIG. 9 may be implemented on tracking devices without specifying additional sensor(s), sensing equipment(s), and/or hardware components, which may reduce the manufacturing cost of the tracking devices and/or the power consumption of the tracking devices from using the sensor(s). As such, aspects discussed in connection with FIGS. 7 to 9 may be used to replace or augment with other detection methods such as acceleration sensing and/or pressure change sensing to comply with airline regulations.

Figure 10:
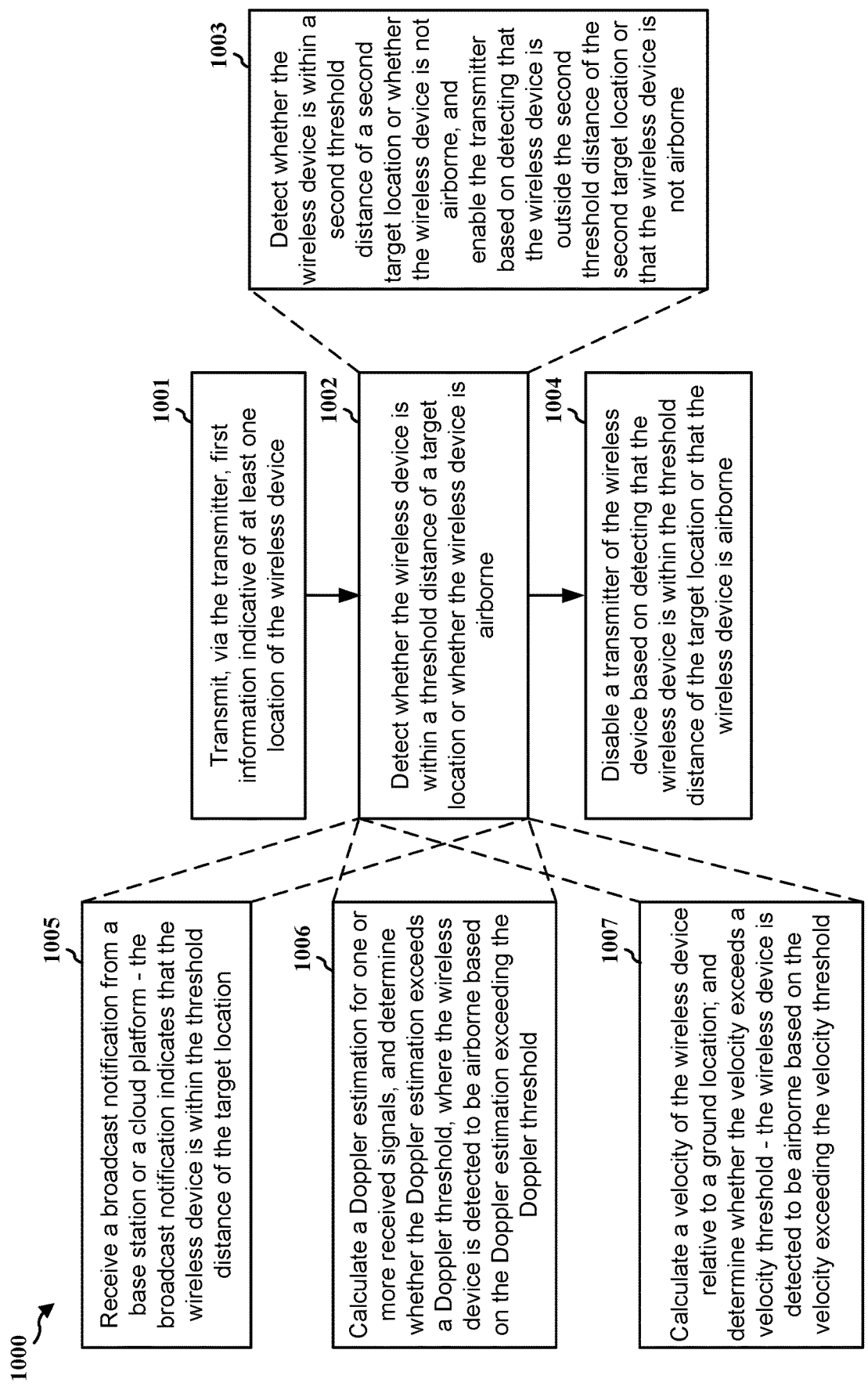
FIG. 10 is a flowchart of a method of wireless communication.

FIG. 10 is a flowchart 1000 of a method of wireless communication. The method may be performed by a wireless device (e.g., the UE 104, 404; the tracking device 502, 702; the apparatus 1204). The method may enable the wireless device, which may be a tracking device using for tracking a cargo, to disable its transmitter based on determining whether the wireless device is within the vicinity or a threshold distance of an airport and/or based on information or measurements obtained from its modem receiver.

At 1001, the wireless device may transmit, via the transmitter, first information indicative of at least one location of the wireless device, where the first information is transmitted prior to disabling the transmitter.

At 1002, the wireless device may detect whether the wireless device is within a threshold distance (e.g., 1 mile, 2 miles, etc.) of a target location (e.g., an airport, a designated place, etc.) or whether the wireless device is airborne, such as described in connection with FIGS. 7 to 9. For example, as shown by FIG. 7, the tracking device 702 may detect whether it is within the vicinity of the airport 710, and as shown by FIG. 9, the tracking device 702 may detect whether it is airborne. The detection of whether the wireless device is within a threshold distance of a target location or whether the wireless device is airborne may be performed by, e.g., the tracking device configuration component 198, the cellular baseband processor 1224, and/or the transceiver(s) 1222 of the apparatus 1204 in FIG. 12.

At 1004, the wireless device may disable a transmitter of the wireless device based on detecting that the wireless device is within the threshold distance of the target location or that the wireless device is airborne, such as described in connection with FIGS. 7 to 9. For example, as shown by FIG. 7, the tracking device 702 may disable its transmission function when it detects that it is within the vicinity of the airport 710, and as shown by FIG. 9, the tracking device 702 may disable its transmission function when it detects that it is airborne. The disabling of the transmitter may be performed by, e.g., the tracking device configuration component 198 and/or the cellular baseband processor 1224 of the apparatus 1204 in FIG. 12.

At 1003, the wireless device may detect whether the wireless device is within a second threshold distance of a second target location (e.g., a second airport, the destination airport) or whether the wireless device is not airborne, and the wireless device may enable the transmitter based on detecting that the wireless device is outside the second threshold distance of the second target location or that the wireless device is not airborne.

In one example, the wireless device is detected to be within the threshold distance of the target location and the transmitter is disabled based on the wireless device being within the threshold distance of the target location. In such an example, the wireless device is detected to be within the threshold distance of the target location based on terrestrial positioning information. In such an example, the terrestrial positioning information may be based on a location from a GPS module or a cell ID.

In another example, as shown at 1005, the wireless device may receive a broadcast notification from a base station or a cloud platform (e.g., broadcast messages from the base station, such as via system information block (SIB)), where the broadcast notification indicates that the wireless device is within the threshold distance of the target location.

In another example, the wireless device may disable the transmitter further based on at least one of: an acceleration of the wireless device exceeding an acceleration threshold; a rate of pressure change exceeding a pressure change threshold; a detection of a sonic wave from an aircraft engine; or a detection of an aircraft transponder signal.

In another example, as shown at 1006, the wireless device is detected to be airborne and the transmitter is disabled based on the wireless device being airborne. In such an example, the wireless device may calculate a Doppler estimation for one or more received signals, and the wireless device may determine whether the Doppler estimation exceeds a Doppler threshold, where the wireless device is detected to be airborne based on the Doppler estimation exceeding the Doppler threshold.

In another example, as shown at 1007 the wireless device may calculate a velocity of the wireless device relative to a ground location, and the wireless device may determine whether the velocity exceeds a velocity threshold, where the wireless device is detected to be airborne based on the velocity exceeding the velocity threshold.

In another example, the wireless device may be located on cargo on an aircraft, and where the wireless device is used for tracking a location of the cargo.

In another example, the wireless device is detected to be airborne if the wireless device is scheduled to be airborne within a threshold time period.

In another example, the wireless device is a tracking device, and where the target location is an airport.

Figure 11:
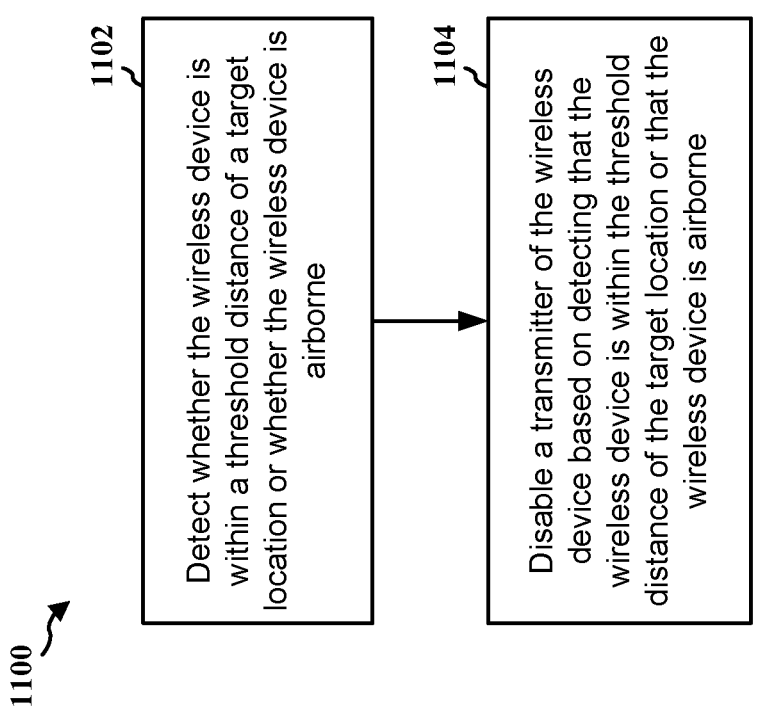
FIG. 11 is a flowchart of a method of wireless communication.

FIG. 11 is a flowchart 1100 of a method of wireless communication. The method may be performed by a wireless device (e.g., the UE 104, 404; the tracking device 502, 702; the apparatus 1204). The method may enable the wireless device, which may be a tracking device using for tracking a cargo, to disable its transmitter based on determining whether the wireless device is within the vicinity or a threshold distance of an airport and/or based on information or measurements obtained from its modem receiver.

At 1102, the wireless device may detect whether the wireless device is within a threshold distance (e.g., 1 mile, 2 miles, etc.) of a target location (e.g., an airport, a designated place, etc.) or whether the wireless device is airborne, such as described in connection with FIGS. 7 to 9. For example, as shown by FIG. 7, the tracking device 702 may detect whether it is within the vicinity of the airport 710, and as shown by FIG. 9, the tracking device 702 may detect whether it is airborne. The detection of whether the wireless device is within a threshold distance of a target location or whether the wireless device is airborne may be performed by, e.g., the tracking device configuration component 198, the cellular baseband processor 1224, and/or the transceiver(s) 1222 of the apparatus 1204 in FIG. 12.

At 1104, the wireless device may disable a transmitter of the wireless device based on detecting that the wireless device is within the threshold distance of the target location or that the wireless device is airborne, such as described in connection with FIGS. 7 to 9. For example, as shown by FIG. 7, the tracking device 702 may disable its transmission function when it detects that it is within the vicinity of the airport 710, and as shown by FIG. 9, the tracking device 702 may disable its transmission function when it detects that it is airborne. The disabling of the transmitter may be performed by, e.g., the tracking device configuration component 198 and/or the cellular baseband processor 1224 of the apparatus 1204 in FIG. 12.

In one example, the wireless device may transmit, via the transmitter, first information indicative of at least one location of the wireless device, where the first information is transmitted prior to disabling the transmitter.

In another example, the wireless device may detect whether the wireless device is within a second threshold distance of a second target location or whether the wireless device is not airborne, and the wireless device may enable the transmitter based on detecting that the wireless device is outside the second threshold distance of the second target location or that the wireless device is not airborne.

In another example, the wireless device is detected to be within the threshold distance of the target location and the transmitter is disabled based on the wireless device being within the threshold distance of the target location. In such an example, the wireless device is detected to be within the threshold distance of the target location based on terrestrial positioning information. In such an example, the terrestrial positioning information may be based on a location from a GPS module or a cell ID.

In another example, the wireless device may receive a broadcast notification from a base station or a cloud platform, where the broadcast notification indicates that the wireless device is within the threshold distance of the target location.

In another example, the wireless device may disable the transmitter further based on at least one of: an acceleration of the wireless device exceeding an acceleration threshold; a rate of pressure change exceeding a pressure change threshold; a detection of a sonic wave from an aircraft engine; or a detection of an aircraft transponder signal.

In another example, the wireless device is detected to be airborne and the transmitter is disabled based on the wireless device being airborne. In such an example, the wireless device may calculate a Doppler estimation for one or more received signals, and the wireless device may determine whether the Doppler estimation exceeds a Doppler threshold, where the wireless device is detected to be airborne based on the Doppler estimation exceeding the Doppler threshold.

In another example, the wireless device may calculate a velocity of the wireless device relative to a ground location, and the wireless device may determine whether the velocity exceeds a velocity threshold, where the wireless device is detected to be airborne based on the velocity exceeding the velocity threshold.

In another example, the wireless device may be located on cargo on an aircraft, and where the wireless device is used for tracking a location of the cargo.

In another example, the wireless device is detected to be airborne if the wireless device is scheduled to be airborne within a threshold time period.

In another example, the wireless device is a tracking device, and where the target location is an airport.

Figure 12:
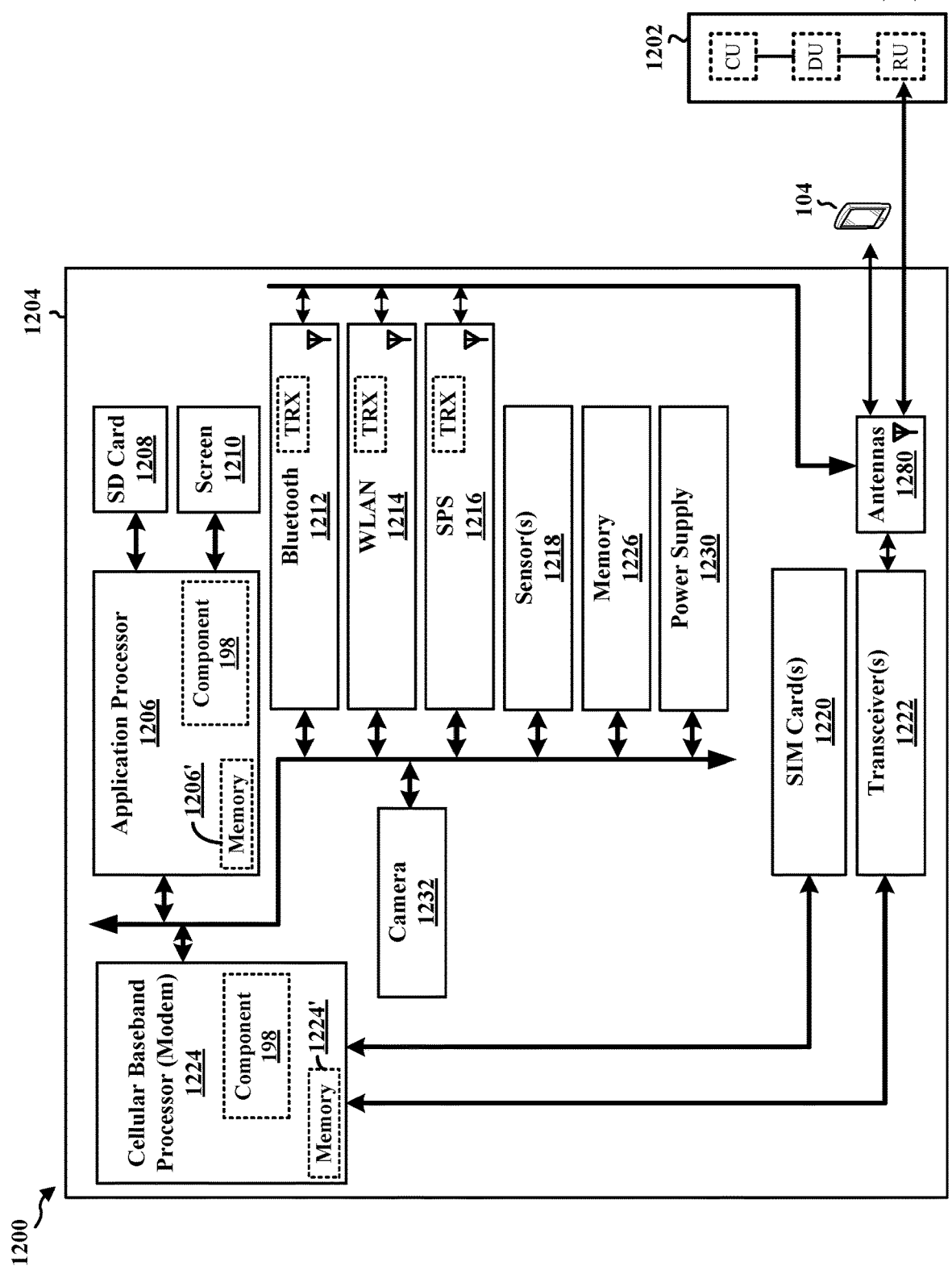
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the tracking device configuration component 198 may be configured to detect whether the wireless device is within a threshold distance of a target location or whether the wireless device is airborne. The tracking device configuration component 198 may also be configured to disable a transmitter of the wireless device based on detecting that the wireless device is within the threshold distance of the target location or that the wireless device is airborne. The tracking device configuration component 198 may be within the cellular baseband processor 1224, the application processor 1206, or both the cellular baseband processor 1224 and the application processor 1206. The tracking device configuration component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, may include means for detecting whether the wireless device is within a threshold distance of a target location or whether the wireless device is airborne. The apparatus 1204 may further include means for disabling a transmitter of the wireless device based on detecting that the wireless device is within the threshold distance of the target location or that the wireless device is airborne.

In another configuration, the apparatus 1204 further includes means for transmitting, via the transmitter, first information indicative of at least one location of the wireless device, where the first information is transmitted prior to disabling the transmitter.

In another configuration, the apparatus 1204 further includes means for detecting whether the wireless device is within a second threshold distance of a second target location or whether the wireless device is not airborne. The apparatus 1204 further includes means for enabling the transmitter based on detecting that the wireless device is outside the second threshold distance of the second target location or that the wireless device is not airborne.

In another configuration, the apparatus 1204 is detected to be within the threshold distance of the target location and the transmitter is disabled based on the apparatus 1204 being within the threshold distance of the target location. In such a configuration, the apparatus 1204 is detected to be within the threshold distance of the target location based on terrestrial positioning information. In such a configuration, the terrestrial positioning information may be based on a location from a GPS module or a cell ID.

In another configuration, the apparatus 1204 further includes mans for receiving a broadcast notification from a base station or a cloud platform, where the broadcast notification indicates that the apparatus 1204 is within the threshold distance of the target location.

In another configuration, the means for disabling the transmitter is further based on at least one of: an acceleration of the apparatus 1204 exceeding an acceleration threshold; a rate of pressure change exceeding a pressure change threshold; a detection of a sonic wave from an aircraft engine; or a detection of an aircraft transponder signal.

In another configuration, the apparatus 1204 is detected to be airborne and the transmitter is disabled based on the apparatus 1204 being airborne. In such a configuration, the apparatus 1204 further includes means for calculating a Doppler estimation for one or more received signals. The apparatus 1204 further includes means for determining whether the Doppler estimation exceeds a Doppler threshold, where the apparatus 1204 is detected to be airborne based on the Doppler estimation exceeding the Doppler threshold.

In another configuration, the apparatus 1204 further includes means for calculating a velocity of the apparatus 1204 relative to a ground location. The apparatus 1204 further includes means for determining whether the velocity exceeds a velocity threshold, where the apparatus 1204 is detected to be airborne based on the velocity exceeding the velocity threshold.

In another configuration, the apparatus 1204 may be located on cargo on an aircraft, and where the apparatus 1204 is used for tracking a location of the cargo.

In another configuration, the apparatus 1204 is detected to be airborne if the apparatus 1204 is scheduled to be airborne within a threshold time period.

In another configuration, the apparatus 1204 is a tracking device, and where the target location is an airport.

The means may be the tracking device configuration component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first apparatus, including: detecting whether the wireless device is within a threshold distance of a target location or whether the wireless device is airborne; and disabling a transmitter of the wireless device based on detecting that the wireless device is within the threshold distance of the target location or that the wireless device is airborne.

Aspect 2 is the method of aspect 1, further including transmitting, via the transmitter, first information indicative of at least one location of the wireless device, where the first information is transmitted prior to disabling the transmitter.

Aspect 3 is the method of aspect 2, further including detecting whether the wireless device is within a second threshold distance of a second target location or whether the wireless device is not airborne; and enabling the transmitter based on detecting that the wireless device is outside the second threshold distance of the second target location or that the wireless device is not airborne.

Aspect 4 is the method of any of aspects 1 to 3, where the wireless device is detected to be within the threshold distance of the target location and the transmitter is disabled based on the wireless device being within the threshold distance of the target location.

Aspect 5 is the method of aspect 4, where the wireless device is detected to be within the threshold distance of the target location based on terrestrial positioning information.

Aspect 6 is the method of aspect 5, where the terrestrial positioning information is based on a location from a GPS module or a cell ID.

Aspect 7 is the method of aspect 4, further including receive a broadcast notification from a base station or a cloud platform, where the broadcast notification indicates that the wireless device is within the threshold distance of the target location.

Aspect 8 is the method of aspect 4, further including disabling the transmitter further based on at least one of: an acceleration of the wireless device exceeding an acceleration threshold; a rate of pressure change exceeding a pressure change threshold; a detection of a sonic wave from an aircraft engine; or a detection of an aircraft transponder signal.

Aspect 9 is the method of any of aspects 1 to 8, where the wireless device is detected to be airborne and the transmitter is disabled based on the wireless device being airborne.

Aspect 10 is the method of aspect 9, further including calculating a Doppler estimation for one or more received signals; and determining whether the Doppler estimation exceeds a Doppler threshold, where the wireless device is detected to be airborne based on the Doppler estimation exceeding the Doppler threshold.

Aspect 11 is the method of aspect 9, further including calculating a velocity of the wireless device relative to a ground location; and determining whether the velocity exceeds a velocity threshold, where the wireless device is detected to be airborne based on the velocity exceeding the velocity threshold.

Aspect 12 is the method of aspect 9, further including disabling the transmitter further based on at least one of: an acceleration of the wireless device exceeding an acceleration threshold; a rate of pressure change exceeding a pressure change threshold; a detection of a sonic wave from an aircraft engine; or a detection of an aircraft transponder signal.

Aspect 13 is the method of any of aspects 1 to 12, further including where the wireless device is located on cargo on an aircraft, and where the wireless device is used for tracking a location of the cargo.

Aspect 14 is the method of any of aspects 1 to 13, further including where the wireless device is detected to be airborne if the wireless device is scheduled to be airborne within a threshold time period.

Aspect 15 is the method of any of aspects 1 to 14, further including where the wireless device is a tracking device, and where the target location is an airport.

Aspect 16 is an apparatus for wireless communication at a wireless device, including: a memory; and at least one processor coupled to the memory and, based at least in part on information stored in the memory, the at least one processor is configured to implement any of aspects 1 to 15.

Aspect 17 is the apparatus of aspect 16, further including at least one of an antenna or a transceiver coupled to the at least one processor.

Aspect 18 is an apparatus for wireless communication including means for implementing any of aspects 1 to 15.

Aspect 19 is a computer-readable medium (e.g., a non-transitory computer-readable medium) storing computer executable code, where the code when executed by a processor causes the processor to implement any of aspects 1 to 15.

What is claimed is:

1. An apparatus for wireless communication at a wireless device, comprising:
   at least one memory; and
   at least one processor coupled to the at least one memory and, based at least in part on information stored in the memory, the at least one processor is configured to:
      detect the wireless device is airborne based on at least one of a sonic wave from an aircraft engine or an aircraft transponder signal;
      disable a transmitter of the wireless device based on detection of the wireless device being airborne;
      detect the wireless device is not airborne after the detection of the wireless device being airborne; and
      enable the transmitter based on detection of the wireless device being not airborne.

2. The apparatus of claim 1, wherein the at least one processor is further configured to:
   transmit, via the transmitter, first information indicative of at least one location of the wireless device, wherein the first information is transmitted prior to disablement of the transmitter.

3. The apparatus of claim 1, wherein detection of the wireless device being airborne is further based on a rate of pressure change exceeding a pressure change threshold.

4. The apparatus of claim 3, wherein the at least one processor is further configured to:
   estimate the rate of pressure change using a pressure sensor.

5. The apparatus of claim 1, wherein detection of the wireless device being airborne is based on the sonic wave from the aircraft engine.

6. The apparatus of claim 1, wherein detection of the wireless device being airborne is based on the aircraft transponder signal.

7. The apparatus of claim 1, wherein to detect the wireless device is airborne, the at least one processor is configured to detect the wireless device is airborne further based on a velocity or an acceleration of the wireless device exceeding a velocity threshold or an acceleration threshold.

8. The apparatus of claim 1, wherein the at least one processor is further configured to:
   calculate a Doppler estimation for one or more received signals; and
   determine whether the Doppler estimation exceeds a Doppler threshold, wherein detection of the wireless device being airborne is further based on the Doppler estimation exceeding the Doppler threshold.

9. The apparatus of claim 1, wherein detection of the wireless device being airborne is further based on the wireless device being within a threshold distance of an airport.

10. The apparatus of claim 1, wherein the wireless device is located on a cargo of an aircraft, and wherein the wireless device is used for tracking a location of the cargo.

11. The apparatus of claim 1, wherein detection of the wireless device is airborne is further based on the wireless device being scheduled to be airborne within a threshold time period.

12. The apparatus of claim 1, wherein the wireless device is a tracking device.

13. A method of wireless communication at a wireless device, comprising:
   detecting the wireless device is airborne based on at least one of a sonic wave from an aircraft engine or an aircraft transponder signal;
   disabling a transmitter of the wireless device based on detection of the wireless device being airborne;
   detecting the wireless device is not airborne after the detection of the wireless device being airborne; and
   enabling the transmitter based on detection of the wireless device being not airborne.

14. The method of claim 13, further comprising:
   transmitting, via the transmitter, first information indicative of at least one location of the wireless device, wherein the first information is transmitted prior to disablement of the transmitter.

15. The method of claim 13, wherein detection of the wireless device being airborne is further based on a rate of pressure change exceeding a pressure change threshold.

16. The method of claim 15, further comprising:
   estimating the rate of pressure change using a pressure sensor.

17. The method of claim 13, wherein detection of the wireless device being airborne is based on the sonic wave from the aircraft engine.

18. The method of claim 13, wherein detection of the wireless device being airborne is based on the aircraft transponder signal.

19. The method of claim 13, wherein detecting the wireless device is airborne comprises detecting the wireless device is airborne further based on a velocity or an acceleration of the wireless device exceeding a velocity threshold or an acceleration threshold.

20. The method of claim 13, further comprising:
   calculating a Doppler estimation for one or more received signals; and
   determining whether the Doppler estimation exceeds a Doppler threshold, wherein detection of the wireless device being airborne is further based on the Doppler estimation exceeding the Doppler threshold.

21. The method of claim 13, wherein the wireless device is located on a cargo of an aircraft, and wherein the wireless device is used for tracking a location of the cargo.

22. The method of claim 13, wherein the wireless device is detected to be airborne if the wireless device is scheduled to be airborne within a threshold time period.

23. An apparatus for wireless communication at a wireless device, comprising:
   means for detecting the wireless device is airborne based on at least one of a sonic wave from an aircraft engine or an aircraft transponder signal;
   means for disabling a transmitter of the wireless device based on detection of the wireless device being airborne;
   means for detecting the wireless device is not airborne after the detection of the wireless device being airborne; and
   means for enabling the transmitter based on detection of the wireless device being not airborne.

24. A non-transitory computer-readable medium storing computer executable code at a wireless device, the code when executed by a processor causes the processor to:
- detect the wireless device is airborne based on at least one of a sonic wave from an aircraft engine or an aircraft transponder signal;
- disable a transmitter of the wireless device based on detection of the wireless device being airborne;
- detect the wireless device is not airborne after the detection of the wireless device being airborne; and
- enable the transmitter based on detection of the wireless device being not airborne.

* * * * *